United States Patent
Hedström

(10) Patent No.: US 7,371,969 B2
(45) Date of Patent: May 13, 2008

(54) LEAD-THROUGH MEANS FOR CABLES OR PIPES

(75) Inventor: Hans Hedström, Rättvik (SE)

(73) Assignee: Roxtec, Karlskrona (SE)

( * ) Notice: Subject to any disclaimer, the term of this patent is extended or adjusted under 35 U.S.C. 154(b) by 0 days.

(21) Appl. No.: 10/582,442

(22) PCT Filed: Dec. 8, 2004

(86) PCT No.: PCT/SE2004/001828

§ 371 (c)(1),
(2), (4) Date: Mar. 27, 2007

(87) PCT Pub. No.: WO2005/057749

PCT Pub. Date: Jun. 23, 2005

(65) Prior Publication Data

US 2007/0199728 A1      Aug. 30, 2007

(30) Foreign Application Priority Data

Dec. 12, 2003   (SE) ..................... 0303361

(51) Int. Cl.
*H01B 17/26*    (2006.01)
*F16L 5/00*    (2006.01)
(52) U.S. Cl. ......................... 174/151; 248/56
(58) Field of Classification Search ........... 248/56, 248/68.1; 174/65 R, 151, 65 SS, 77 R; 277/603, 277/607, 627

See application file for complete search history.

(56) References Cited

U.S. PATENT DOCUMENTS 5,938,152 A * 8/1999 Kreutz .................. 248/56
(Continued)

FOREIGN PATENT DOCUMENTS

DE       20116654 U1 *  3/2002
(Continued)

*Primary Examiner*—Quyen P Leung

(57) ABSTRACT

The invention concerns a lead-through means for cables or pipes comprising an outer frame (11) and having at least one sealing module (1) arranged inside the frame and which at least one module surrounds a cable or a pipe (8). The sealing module (1) is divided in its longitudinal direction and is built up with peelable sheets (3) for adaptation of its duct area to the actual cable or pipe (8) and which sealing module (1) is intended to fill out the opening of the frame (11) together with at least one expansion unit (12). The sealing module (1) has a dividing cut (2') for division into two halves which cut runs obliquely in relation to the longitudinal direction of the sealing module (1) or the longitudinal axis (5) of its duct (4), whereby at an adaptation of the sealing module (1) to the actual cable or pipe (8) one module half (1') may be turned 180° during a first stage to achieve a conical duct through the sealing module (1) at the same time as an oblique gap (6) is formed between the module halves (1', 20 1"). The module (1) may there after be adapted to the actual cable or pipe (8) until the module halves (1, 1") reach each other at the narrow end (6') of the gap (6) and which one half (1') during a second stage may be turned back 180°, whereby an even gap (7) having the correct measurements is obtained simultaneously with a complete sealing against the cable or pipe (8) going through the sealing module (1) and the frame (11) after activation of the expansion unit (12).

2 Claims, 2 Drawing Sheets

U.S. PATENT DOCUMENTS

Figure 1:
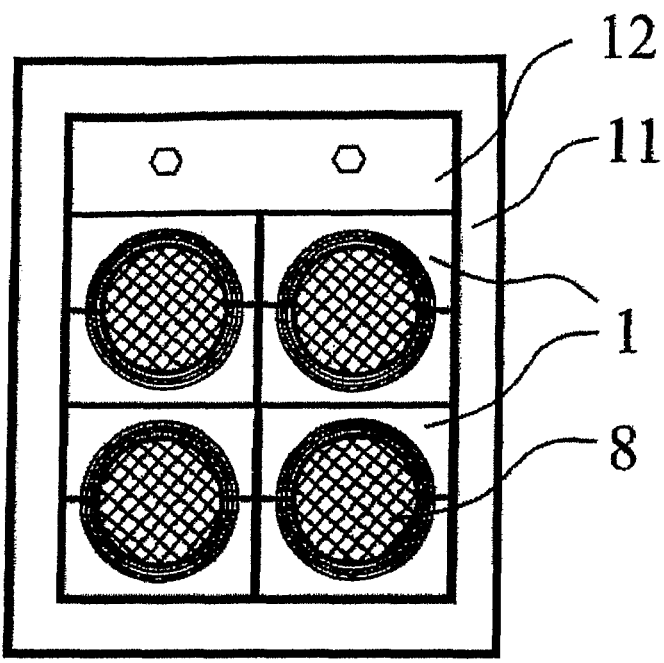

| | | | |
|---|---|---|---|
| 6,521,840 B1 * | 2/2003 | Kreutz | 174/151 |
| 6,543,780 B1 * | 4/2003 | Kogler et al. | 277/312 |
| 2005/0121217 A1 * | 6/2005 | Hedstrom | 174/52.3 |

FOREIGN PATENT DOCUMENTS

| | | | |
|---|---|---|---|
| DE | 29924396 U1 * | 1/2003 | |
| GB | 2204922 A * | 11/1988 | |
| JP | 2001136645 A * | 5/2001 | |
| WO | WO 0352895 A1 * | 6/2003 | |

* cited by examiner

LEAD-THROUGH MEANS FOR CABLES OR PIPES

The present invention concerns a lead-through means for cables or pipes and comprises an outer frame having at least one sealing module received in the frame and surrounding a cable or a pipe, which at least one module is meant to fill out the opening of the frame together with at least one expansion unit. By means of the expansion unit the sealing module and possible further adjacent one or more sealing modules may be pressed against the frame and against each other in such a way that sealing is achieved.

Prior art exist in which when cables are to be inserted in e.g. a switch cabinet or through a wall a sealing frame is attached over an actual opening. The cables or the pipes are then lead through the frame. A sealing module is attached around each cable or pipe. The sealing modules fill out the opening of the frame together with said expansion unit, which in turn presses the sealing modules against each other and the frame in such a way that a sealing is achieved. The sealing modules are normally divided in the longitudinal direction to allow the actual cable or pipe to be inserted. To adapt the sealing modules to the different cables or pipes the sealing modules are built up of peelable sheets. Known solutions using this technique are described in the British patent GB 2 186 443 and in the publication WO 01/28057.

One problem with the known technique is that exactly the right number of sheets must be removed to obtain sealing. Should too many sheets be removed the sealing module will fit loosely around the actual cable or pipe and should too few sheets be removed a too extensive gap will be formed between the edges of the module halves and sealing cannot be obtained. In order to obtain the best result a very small gap must namely exist between the halves, in order for the cable or pipe to be clamped and also for the edges of the module halves to be pressed together when an expansion unit made use of applied pressure.

The object of the present invention is to solve this problem at a lead-through means for cables of the type described above and the distinctive features of the invention are stated in the subsequent claims.

By means of the invention a lead-through means for cables is now achieved, which in an excellent way meets its object and at the same time is inexpensive and easy to produce. With the lead-through means of the invention a completely tight connection to a cable or pipe may be achieved in that the cut, made at the partition of the sealing module into two halves, is placed obliquely in relation to the longitudinal axis of the duct which is to receive the actual cable or pipe. This inclination is chosen in view of the thickness of the peelable sheets. At the adaptation of the module to the actual cable or pipe one module half is turned, thereby giving a conical duct through the sealing module. When this module is placed on a cable or pipe an oblique gap is formed between the module halves and in the adaptation of the module to the cable or pipe the inner sheets of the sealing module are peeled off until the module halves reach each other at the narrow end of the gap and finally the one module half is once again turned 180° and an even gap having the correct measurement is obtained in order to produce the very small gap that is needed between the module halves before they are pressed against each other and the frame by means of an expansion unit.

Figure 2:
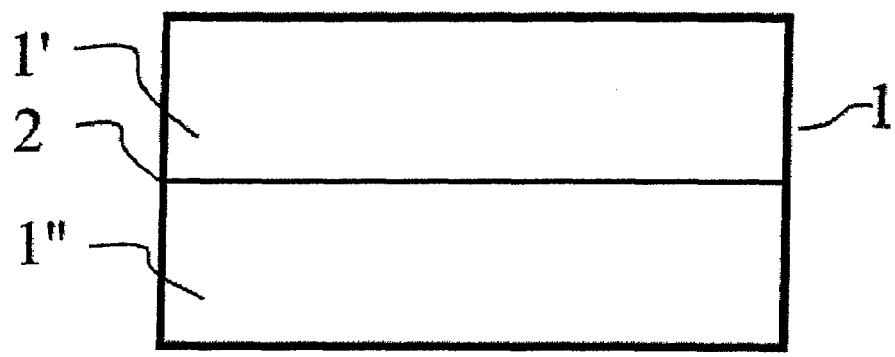
Figure 3:
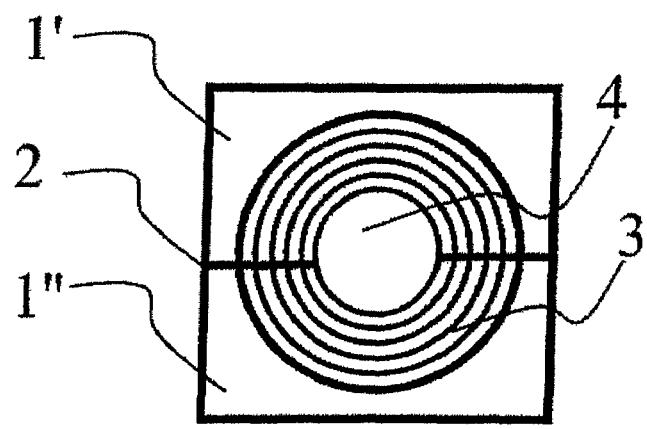
Figure 4:
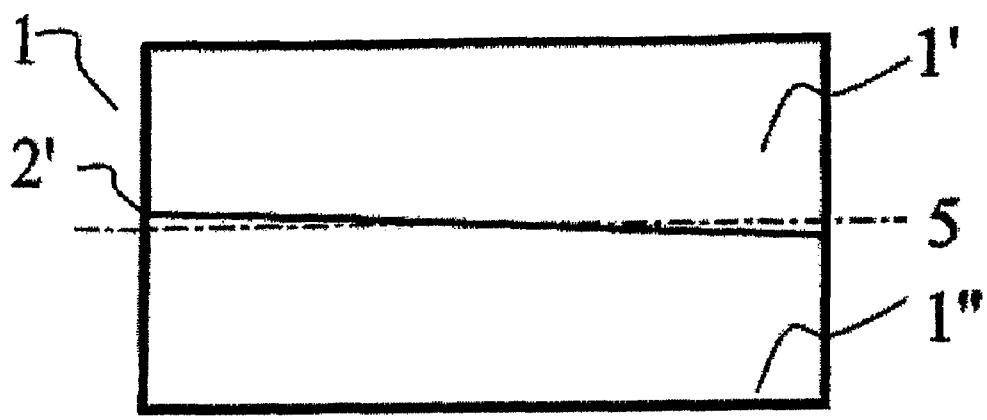
Figure 5:
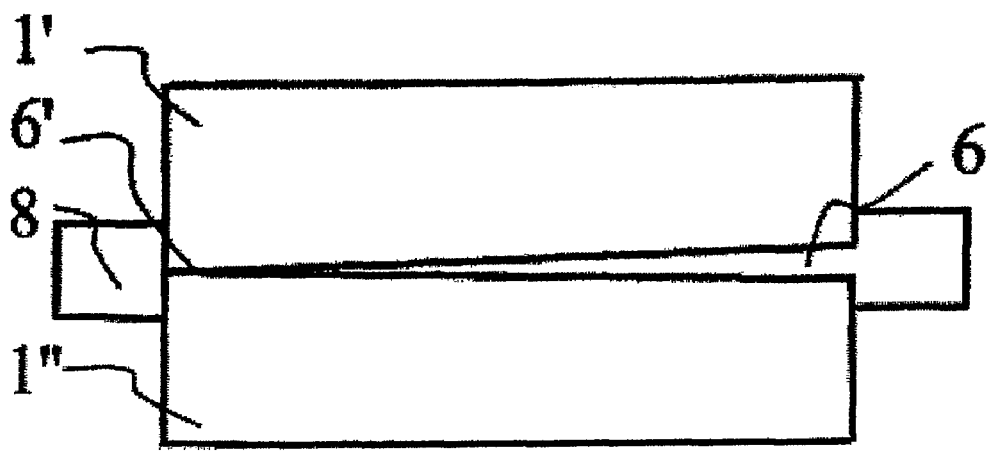
Figure 6:
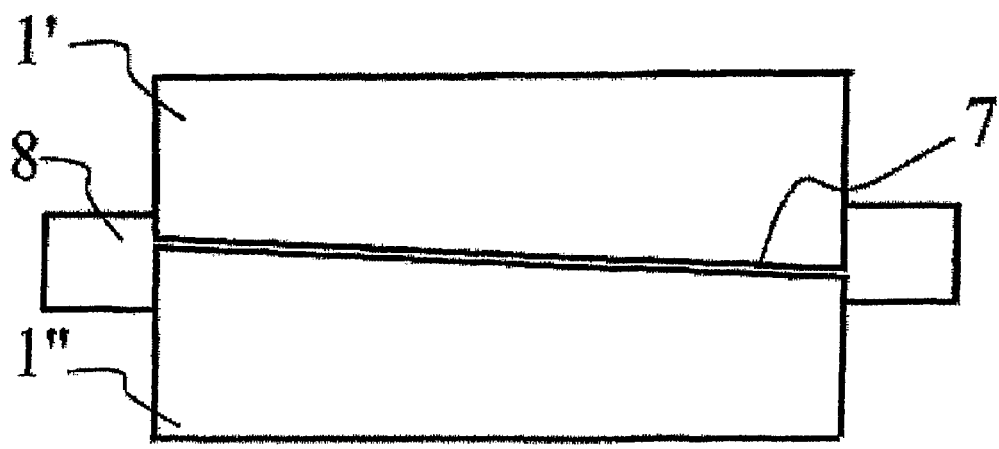

The invention will be described more closely below by means of a preferred embodiment and with reference to the attached drawing, in which FIG. 1 shows a view in cross section of a lead-through means for cables or pipes according to the present invention, FIG. 2 shows a side view of a known sealing module now being used in the lead-through means of FIG. 1, FIG. 3 shows an enlarged view of the sealing module of FIG. 2, formed of two identically large module halves having inner peeleable sheets for the actual cable or pipe, FIG. 4 shows a side view of a sealing module according to the present invention having an obliquely going cut in relation to the longitudinal axis of the module, FIG. 5 schematically shows how a sealing module according to FIG. 4 is adapted to an actual cable after peeling off of a requisite number of inner sheets in order to have a narrow gap at the left end; and FIG. 6 shows here after what the sealing module looks like when the upper half has been turned 180° in relation to the lower half in order to form an evenly going gap between the edges of the module halves.

As shown by the Figs. the invention according to its preferred embodiment comprises a lead-through means for cables consisting of an outer frame 11 with four sealing modules 1 for cables or pipes arranged in said frame, and which modules each consists of two halves 1' and 1" being compressible by means of an expansion unit 12 placed in the frame 11.

In FIGS. 2 and 3 a sealing module known as such is shown having a horizontal cut 2 through it for the insertion of a cable or a pipe 8. At 3 the peelable inner sheets of the sealing module 1 are shown.

In FIGS. 4-6 it is schematically shown how a sealing module 1 according to the invention looks and in which the dividing cut 2', dividing the module 1 into two halves 1' and 1", runs obliquely in relation to the longitudinal direction of the sealing module or the longitudinal axis 5 of the duct 4. This dividing cut 2 has an inclination depending on the thickness of the peelable sheets 3. At a placing of a cable 8 with an actual cross section in the sealing module 1 one module half 1' is turned 180° during a first stage in order to achieve a conical duct through the sealing module 1 at the same time as an oblique gap 6 arises between the module halves 1' and 1". Then the module 1 is adapted to the actual cable 8 by removal of the peelable sheets 3 until the module halves 1' and 1" reach each other at the narrow end 6' of the gap 6, as shown in FIG. 5. Thereafter during a second stage e.g. the upper module half 1' is again turned 180° so that an even gap 7 is formed, shown more closely in FIG. 6 with correct measurement. When then the expansion unit 12 is activated, finally a totally adequate seal is established around the actual cable or pipe 8.

In the chosen actual example the sealing frame 11 is rectangular having an expansion unit 12 and close by the same two sealing modules arranged in pairs, which modules are compressible in the frame 11 by means of the expansion unit 12 and this is done first after that respective sealing module 1 is adapted to the actual area of the cables 8, going through the lead-through means, as is seen in FIGS. 4-6.

In a not shown embodiment the expansion unit is formed as a gasket surrounding the sealing modules, that is it stretches around these at the same time as the outer side parts of it abuts against the frame and its inner side parts against the sealing modules.

The invention claimed is:
1. A lead-through means for cables or pipes comprising:
   an outer frame having at least one sealing module surrounding a cable or a pipe and arranged inside the frame, which sealing module is divided in longitudinal direction and is built up with peelable sheets for adaptation of its duct area to the actual cable or pipe and which sealing module is intended to fill out the opening of the frame together with at least one expansion unit, by means of which the sealing module and possible one or more further adjacent sealing modules are compressible in such a way that a sealing is achieved, wherein the sealing module has a dividing cut for division into two halves, which cut runs obliquely in relation to the longitudinal direction of the sealing module or the longitudinal axis of its duct and which dividing cut has an inclination depending on the thickness of the peelable sheets, whereby at an adaptation of the sealing module to the actual cable or pipe one of the module halves may be turned 180° during a first stage to achieve a conical duct through the sealing module at the same time as an oblique gap is formed between the module halves, where after the module may be adapted to the actual cable or pipe until the module halves reach each other at the narrow end of the gap and which one half during a second stage may be turned back 180°, whereby an even gap having the correct measurements is obtained together with a complete sealing against the cable or pipe going through the sealing module and the frame after activation of the expansion unit.

2. The means of claim 1, wherein the sealing frame is rectangular having two or four sealing modules arranged in pairs in the same, which modules are compressible in the frame with an expansion unit acting against these modules and the frame.

\* \* \* \* \*